(12) United States Patent
Stevens et al.

(10) Patent No.: US 10,662,791 B2
(45) Date of Patent: May 26, 2020

(54) SUPPORT RING WITH FLUID FLOW METERING

(71) Applicant: UNITED TECHNOLOGIES CORPORATION, Farmington, CT (US)

(72) Inventors: Michael S. Stevens, Alfred, ME (US); David Richard Griffin, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/161,194

(22) Filed: Oct. 16, 2018

(65) Prior Publication Data

US 2019/0178097 A1 Jun. 13, 2019

Related U.S. Application Data

(60) Provisional application No. 62/596,156, filed on Dec. 8, 2017.

(51) Int. Cl.
*F01D 9/04* (2006.01)
*F01D 25/24* (2006.01)
(Continued)

(52) U.S. Cl.
CPC ............. *F01D 9/042* (2013.01); *F01D 5/225* (2013.01); *F01D 11/001* (2013.01); *F01D 11/08* (2013.01); *F01D 25/12* (2013.01); *F01D 25/24* (2013.01); *F01D 25/243* (2013.01); *F01D 25/246* (2013.01); *F01D 9/06* (2013.01);
(Continued)

(58) Field of Classification Search
CPC . F01D 9/042; F01D 9/06; F01D 5/225; F01D 11/08; F01D 11/001; F01D 25/12; F01D 25/24; F01D 25/243; F01D 25/246; F05D 2240/11; F05D 2240/30;
(Continued)

(56) References Cited

U.S. PATENT DOCUMENTS 3,959,966 A * 6/1976 Pearce .................... F01D 9/023
60/796
3,966,354 A * 6/1976 Patterson ................ F01D 11/18
415/116

(Continued)

FOREIGN PATENT DOCUMENTS

| EP | 2474707 A2 | 7/2012 |
|---|---|---|
| GB | 126830 | 5/1919 |
| WO | 2014150353 A1 | 9/2014 |

OTHER PUBLICATIONS

European Search Report for European Patent Application No. 18211432.2, dated Apr. 15, 2019.

*Primary Examiner* — Nathaniel E Wiehe
*Assistant Examiner* — Ryan C Clark
(74) *Attorney, Agent, or Firm* — Carlson, Gaskey & Olds, P.C.

(57) ABSTRACT

A support ring for a gas turbine engine includes a main body portion extending circumferentially about a center axis, a radially extending portion extending radially inward from the main body portion and having a plurality of openings, and a plurality of anti-rotation tabs extending radially inward from the main body portion and axially spaced from the radially extending portion.

19 Claims, 6 Drawing Sheets

(51) Int. Cl.
  *F01D 25/12* (2006.01)
  *F01D 5/22* (2006.01)
  *F01D 11/00* (2006.01)
  *F01D 11/08* (2006.01)
  *F01D 9/06* (2006.01)
  *F02C 7/20* (2006.01)
  *F02C 3/14* (2006.01)
  *F23R 3/60* (2006.01)

(52) U.S. Cl.
  CPC ............... *F02C 3/14* (2013.01); *F02C 7/20* (2013.01); *F05D 2240/11* (2013.01); *F05D 2240/30* (2013.01); *F05D 2240/55* (2013.01); *F05D 2250/38* (2013.01); *F05D 2260/30* (2013.01); *F23R 3/60* (2013.01)

(58) Field of Classification Search
  CPC ............. F05D 2240/55; F05D 2250/38; F05D 2260/30; F02C 3/14; F02C 7/20; F23R 3/60
  See application file for complete search history.

(56) References Cited

U.S. PATENT DOCUMENTS

| | | | |
|---|---|---|---|
| 3,975,901 A * | 8/1976 | Hallinger | ............... F01D 11/16 60/786 |
| 4,251,185 A * | 2/1981 | Karstensen | ............ F01D 11/18 415/110 |
| 4,573,866 A | 3/1986 | Sandy, Jr. et al. | |
| 5,641,267 A | 6/1997 | Proctor et al. | |
| 8,123,473 B2 | 2/2012 | Shapiro | |
| 2014/0050564 A1 | 2/2014 | Hagan et al. | |

* cited by examiner

300↘

302
PROVIDING A STATOR SUPPORT RING 64 RADIALLY OUTWARD OF A PLURALITY OF STATOR VANES 60 AND AN ASSOCIATED PLURALITY OF STATOR PLATFORMS 84

304
ALIGNING A PLURALITY OF OPENINGS 70 IN THE SUPPORT RING WITH A PLURALITY OF BOAS SUPPORT OPENINGS 80 RADIALLY OUTWARD OF ADJACENT ROTOR BLADES 62

306
ENGAGING A PLURALITY OF RADIALLY EXTENDING ANTI-ROTATION TABS 82 OF THE SUPPORT RING 64 WITH A PLURALITY OF RADIAL PROTRUSIONS 112 EXTENDING FROM THE STATOR PLATFORMS 84 TO RESTRICT CIRCUMFERENTIAL ROTATION OF THE STATOR VANES 60

308
ENGAGING THE PLURALITY OF RADIALLY EXTENDING ANTI-ROTATION TABS 82 WITH A PLURALITY OF RADIALLY EXTENDING PROTRUSIONS 116 EXTENDING FROM A COMBUSTOR PANEL 118 IN AN ADJACENT COMBUSTOR SECTION 56 TO RESTRICT CIRCUMFERENTIAL ROTATION OF THE COMBUSTOR PANEL 118

310
ENGAGING A PLURALITY OF AXIALLY EXTENDING ANTI-ROTATION TABS 90 OF THE SUPPORT RING 64 WITH A PLURALITY OF SLOTS 91 IN A DIFFUSER CASE 88 OF THE COMBUSTOR SECTION 56 TO RESTRICT CIRCUMFERENTIAL ROTATION OF THE SUPPORT RING 64

312
POSITIONING AT LEAST A PORTION OF EACH OF THE OPENINGS 70 RADIALLY OUTWARD OF AN OUTER SURFACE 108 OF ONE OR MORE RAILS 106 OF THE STATOR PLATFORMS 84

FIG.6

SUPPORT RING WITH FLUID FLOW METERING

CROSS-REFERENCE TO RELATED APPLICATION

This application claims priority to U.S. Provisional Application No. 62/596,156, which was filed on Dec. 8, 2017.

BACKGROUND

The present disclosure relates to stator support rings for gas turbine engines and more particularly for openings provided therein for the communication of fluid.

Stator support rings can be disposed in stator sections of turbomachines for supporting the stator section and/or restricting rotation of the stator section. Components of the turbomachine can be exposed to extreme heat and can require cooling.

SUMMARY

A support ring for a gas turbine engine according to an example of the present disclosure includes a main body portion extending circumferentially about a center axis, a radially extending portion extending radially inward from the main body portion and having a plurality of openings, and a plurality of anti-rotation tabs extending radially inward from the main body portion and axially spaced from the radially extending portion.

In a further embodiment according to any of the foregoing embodiments, the plurality of openings are cylindrical and are 0.14 to 0.18 inches in diameter.

In a further embodiment according to any of the foregoing embodiments, a center point of each of the plurality of openings is 8.5 to 9.5 inches from the center axis.

In a further embodiment according to any of the foregoing embodiments, the plurality of openings includes 45 openings, wherein the center point of each of the plurality of openings is spaced 8 degrees from the center point of an adjacent one of the plurality of openings.

In a further embodiment according to any of the foregoing embodiments, the support ring includes a first face at a first axial side of the radially extending portion, and a second face at a second axial side of the radially extending portion opposite the first axial side, and the plurality of openings extending from the first face to the second face, wherein the first face lies in a first plane perpendicular to the center axis, and the second face lies in a second plane perpendicular to the center axis.

In a further embodiment according to any of the foregoing embodiments, the plurality of openings are equally spaced apart in the circumferential direction.

In a further embodiment according to any of the foregoing embodiments, the radially extending portion includes a gasket receiving portion radially inward of the plurality of openings.

In a further embodiment according to any of the foregoing embodiments, the support ring includes a plurality of axially extending anti-rotation tabs extending from an axial end of the main body portion.

In a further embodiment according to any of the foregoing embodiments, the support ring includes a top-dead-center marker, and a center point of one of the plurality of openings is spaced 6.67 degrees from the top-dead-center marker.

A gas turbine engine according to an example of the present disclosure is includes a turbine section, including a plurality of stator vanes, a support ring radially outward of the plurality of stator vanes and configured to restrict the plurality of stator vanes from rotating, the support ring including a main body portion extending circumferentially about a center axis, a radially extending portion extending radially from the main body portion and having a plurality of openings, a plurality of rotor blades axially spaced from the plurality of stator vanes, one or more blade outer air seals radially outward of the plurality of rotor blades, and one or more blade outer air seal supports for supporting the one or more blade outer air seals and radially outward of the blade outer air seals, wherein the one or more blade outer air seal supports include a plurality of blade outer air seal support openings, each of the plurality of blade outer air seal support openings at least partially aligned radially and circumferentially with a corresponding one of the plurality of openings in the support ring.

In a further embodiment according to any of the foregoing embodiments, the plurality of openings are cylindrical and are 0.14 to 0.18 inches in diameter, and a center of each of the plurality of openings is 8.5 to 9.5 inches from the center axis.

In a further embodiment according to any of the foregoing embodiments, a first face at a first axial side of the radially extending portion, a second face at a second axial side of the radially extending portion opposite the first axial side, and the plurality of openings extending from the first face to the second face, wherein the first face lies in a first plane perpendicular to the center axis, and the second face lies in a second plane perpendicular to the center axis.

In a further embodiment according to any of the foregoing embodiments, the plurality of openings includes 45 openings, wherein a center point of each of the plurality of openings is spaced 8 degrees from a center point of an adjacent one of the plurality of openings.

In a further embodiment according to any of the foregoing embodiments, the gas turbine engine includes a plurality of radially extending anti-rotation tabs extending radially inward from the main body portion and axially spaced from the radially extending portion, and a plurality of stator platforms radially outward of the plurality of stator vanes and including a plurality of radial protrusions received against the anti-rotation tabs to restrict circumferential rotation of the plurality of stator vanes.

In a further embodiment according to any of the foregoing embodiments, the plurality of stator platforms each include a radially outward extending rail, wherein at least a portion of each of the plurality of openings is radially outward of the rail in an associated one of the plurality of platforms.

In a further embodiment according to any of the foregoing embodiments, the gas turbine engine includes a combustor section comprising a combustor panel, and a plurality of radial protrusions extending radially outward from the combustor panel, wherein the plurality of radial protrusions are received against the plurality of radially extending anti-rotation tabs.

In a further embodiment according to any of the foregoing embodiments, the support ring includes a plurality of axially extending anti-rotation tabs extending from an axial end of the main body portion and each tab configured to be received in a slot in a diffuser case of the combustor section to restrict circumferential rotation of the support ring.

A method of assembling a gas turbine engine according to an example of the present disclosure includes providing a stator support ring radially outward of a plurality of stator vanes and an associated plurality of stator platforms, aligning a plurality of openings in the support ring with a plurality of blade outer air seal support openings in an adjacent rotor section, and engaging a plurality of radially extending anti-rotation tabs of the support ring with a plurality of radial protrusions extending from the stator platforms to restrict circumferential rotation of the stator vanes.

In a further embodiment according to any of the foregoing embodiments, the method includes engaging the plurality of radially extending anti-rotation tabs with a plurality of radially extending protrusions extending from a combustor panel in an adjacent combustor section to restrict circumferential rotation of the combustor panel, and engaging a plurality of axially extending anti-rotation tabs of the support ring with a plurality of slots in a diffuser case of the adjacent combustor section to restrict circumferential rotation of the support ring.

In a further embodiment according to any of the foregoing embodiments, the method includes positioning at least a portion of each of the plurality of openings radially outward of a radially outer surface of one or more rails extending from the stator platforms.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 6 illustrates a flow chart of an example method of assembling a gas turbine engine.

DETAILED DESCRIPTION

Figure 1:
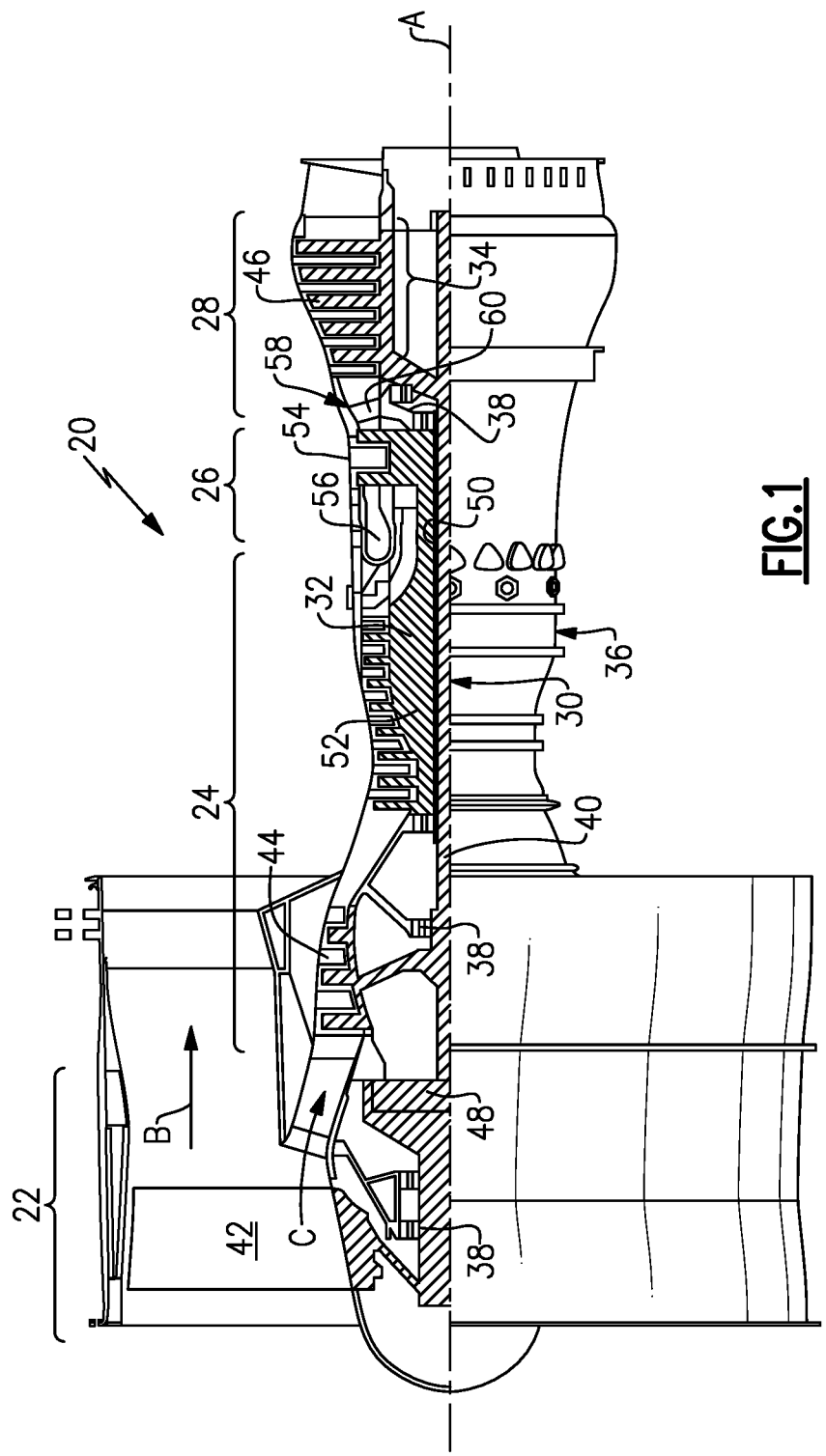
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction [(Tram ° R)/(518.7° R)]^0.5. The "Low corrected fan tip speed" as disclosed herein according to one non-limiting embodiment is less than about 1150 ft/second (350.5 meters/second).

Each of the compressor and turbine sections 24, 28 include stages of static stator vanes 60 and stages of rotating blades 62. A support ring 64 is provided radially outward of a stage of stator vanes 60. In the disclosed example, the support ring 64 is provided in the high pressure turbine 54.

Figure 2:
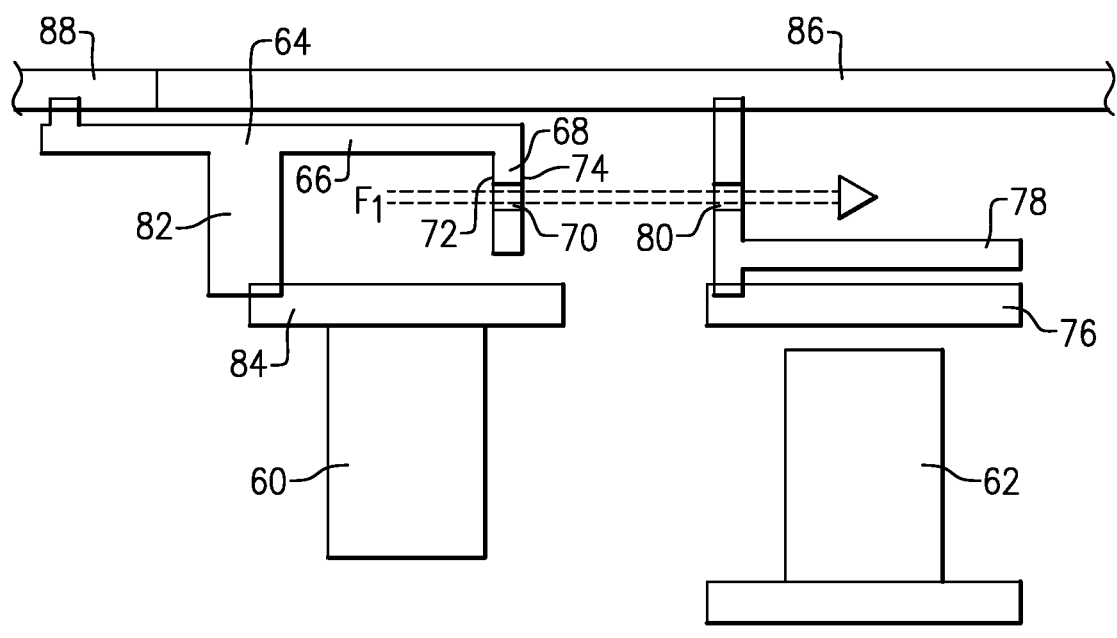
FIG. 2 schematically illustrates an example turbine section of the gas turbine engine.

FIG. 2 schematically illustrates an example support ring 64 in an example turbine section 54. The example support ring 64 includes a circumferentially extending main body portion 66 extending about a center axis $A_1$, which, when assembled, is aligned with the engine axis A. A radially extending portion 68 extends radially inward from the main body portion 66 and include a plurality of openings 70. In the example, the openings 70 are cylindrical in shape, but a person of ordinary skill in the art having the benefit of this disclosure would realize that other shapes may be utilized.

The radially extending portion 68 includes a first face 72 at a forward axial side of the radially extending portion 68 and a second face 74 at an aft axial side of the radially extending portion 68 opposite the forward axial side. In the example, the cylindrical openings 70 extend from the first face 72 to the second face 74.

In the example turbine section 54, the support ring 64 is radially outward of the plurality of stator vanes 60 and configured to restrict the plurality of stator vanes 60 from circumferential rotation. The plurality of rotor blades 62 are axially spaced from the plurality of stator vanes 70, and one or more blade outer air seals 76 are provided radially outward of the plurality of rotor blades 62.

One or more blade outer air seal supports 78 support the one or more blade outer air seals 76 (shown schematically) and are radially outward of and configured to support the blade outer air seals 76. The one or more blade outer air seal supports 78 include a plurality of blade outer air seal support openings 80. In the example, each of the plurality of blade outer air seal support openings 80 is at least partially aligned radially and circumferentially with a corresponding one of the plurality of cylindrical openings 70 in the support ring 64 to allow for fluid flow $F_1$ along an axial stream through the aligned openings 70, 80.

The support ring 64 may include a plurality of anti-rotation tabs 82 extending radially inward from the main body portion 66 and axially spaced forward from the radially extending portion 68. The tabs 82 are configured to engage a plurality of stator platforms 84 radially outward of the plurality of stator vanes 60 (shown schematically) to restrict circumferential movement of the stator vanes 60 and stator platforms 84.

In the example, blade outer air seal supports 78 engage the turbine case 86, and the support ring 64 engages a diffuser case 88 of an adjacent combustor section, one example being combustor 56, shown schematically. In one example, the anti-rotation tabs 82 may also restrict circumferential movement of the combustor 56.

Figure 3:
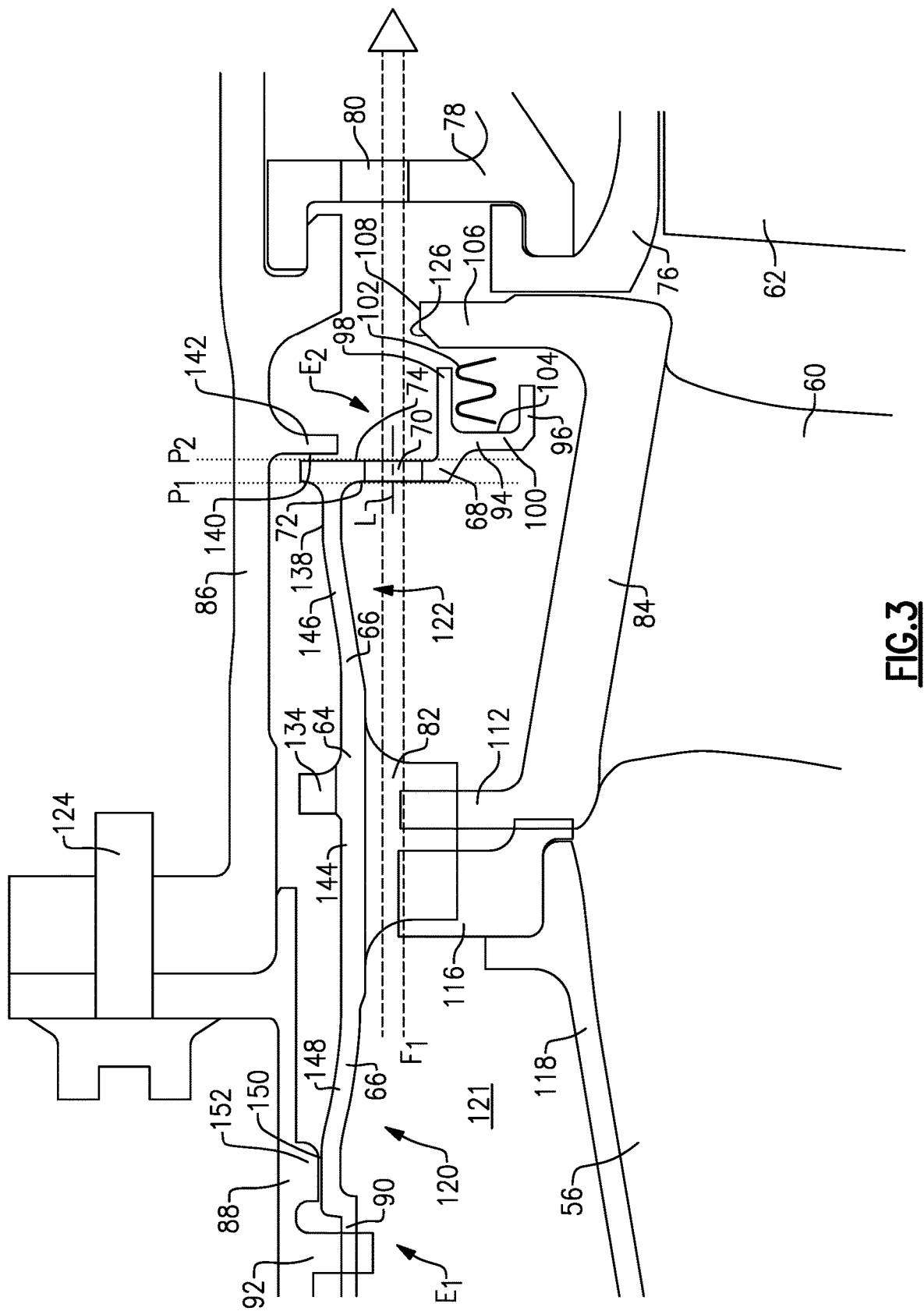
FIG. 3 illustrates a cross sectional view of an example section of a gas turbine engine.

FIG. 3 illustrates an example support ring 64. A radially extending portion 68 extends radially inward from the main body portion 66 and includes cylindrical openings 70 extending axially from the first face 72 to the second face 74. The portion 68 is at an axial end $E_2$ of the support ring 64 axially opposite an axial end $E_1$. At the axial end $E_1$, the support ring 64 includes a plurality of anti-rotation tabs 90 extending axially from the main body portion 66. Each tab 90 is configured to be received in a slot 91 (see FIG. 5) in a radially inward protruding section 92 of the diffuser case 88 of an adjacent combustor section to restrict circumferential rotation of the support ring 64.

The radially extending portion 68 at the axial end $E_2$ of the support ring 64 includes a face 72 lying in a plane $P_1$ and a face 74 lying in a plane $P_2$, and the planes $P_1$ and $P_2$ are parallel. In the example, each of the planes $P_1$ and $P_2$ are perpendicular to the axis $A_1$ of the support ring 64 and the engine axis A. A centerline L through each of the cylindrical openings 70 is parallel to the axis $A_1$ of the support ring 64 and the engine axis A. This configuration allows the fluid F1 to flow directly aft toward the openings 80 of the blade outer air seal supports 78 axially aft of the openings 70.

The radially extending portion 68 includes a gasket receiving portion 94 radially inward of the plurality of cylindrical openings 70. The gasket receiving portion 94 includes an inner extension 96, and an outer extension 98 connected by an interfacing portion 100 that receives a gasket 102 at its face 104. The inner extension 96 and outer extension 98 extend axially aft from the interfacing portion 100. The gasket 102 is also received against a rail 106 of the stator platform 84 opposite the face 104. The outer extension 98 is radially between the gasket 102 and the fluid flow $F_1$.

Figure 4:
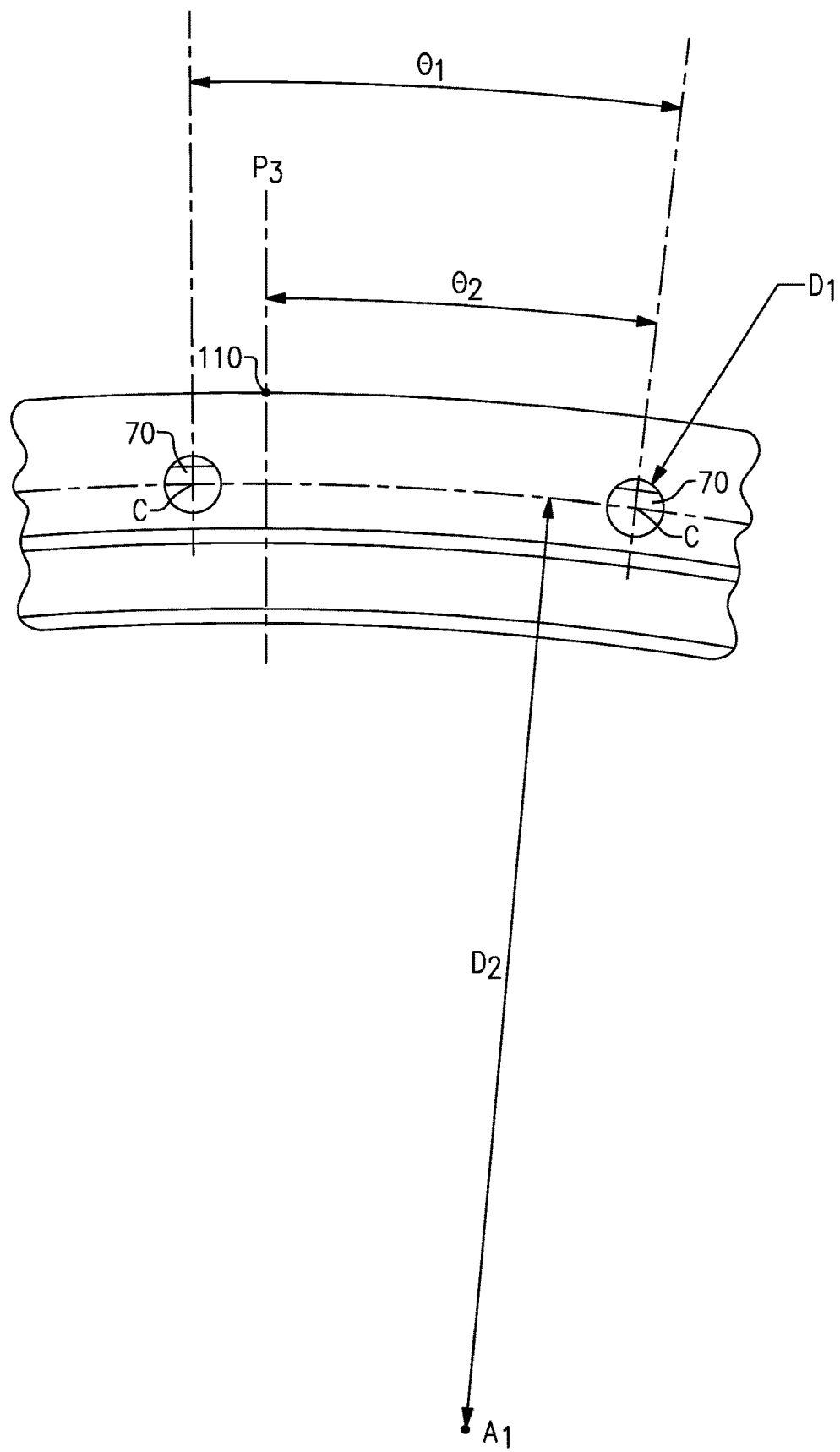
FIG. 4 illustrates a rear view of a section of an example support ring.

The support ring 64 is configured such that at least a major portion of each of the openings 70 is radially outward of the radially outer surface 108 of the rail 106 axially aft of the openings 70 to minimize blockage by the rail 106 of fluid $F_1$ flowing axially from the openings 70 to the openings 80. In one example, as illustrated in FIG. 4, which shows a forward facing view of a section of an example support ring 64, the plurality of openings 70 are cylindrical with a diameter $D_1$ of 0.14 to 0.18 inches (0.35 to 0.46 cm). In another example, the diameter $D_1$ is 0.159 to 0.163 inches (0.403 to 0.415 cm).

In an example, the center point C of each of the plurality of cylindrical openings 70 is a distance $D_2$ of 8.5 to 9.5 inches (21.59 to 24.13 cm) in the radial direction from the center axis A1. In other examples, the distance $D_2$ is 9.008 to 9.018 inches (22.880 to 22.906 cm). The support ring may include 45 cylindrical openings 70, and the center point C of each of the cylindrical openings 70 is spaced an angle $\theta_1$ of about 8 degrees from a center point C of an adjacent one of the cylindrical openings 70. The plurality of openings 70 may be equally spaced in the circumferential direction about the axis A1 from each other. In the examples, the openings 70 are sized and spaced to optimize parameters of the fluid flow F.

The thickness from the first face 72 to the second face 74 of the radially extending portion 68 may be 0.04 to 0.06 inches (0.10 to 0.15 cm). In other examples, the thickness from the first face 72 to the second face 74 is 0.045 inches to 0.055 inches (0.114 to 0.140 cm).

The size and arrangement of the openings 70 in the examples minimizes blockage of the rail 106, optimizes fluid flow parameters such as pressure and flow rate, and aligns the openings 70 with the openings 80. One of ordinary skill in the art having the benefit of this disclosure would recognize that other dimensions and spacing for the openings 70 and/or more or fewer openings 70 could be utilized.

In the example, the blade outer air seal supports 78 also include 45 openings 80, such that each of the 45 openings 70 may be at least partially radially and circumferentially aligned with a corresponding opening 80.

In one example, the support ring 64 includes a top-dead-center marker 110 configured to lie in the top dead center plane $P_3$ extending axially and radially along the top-dead-center circumferential point of the engine. A center point C of one of the openings 70 is spaced an angle $\theta_2$ of 6.67 degrees from the marker 110 when viewed facing forward from an aft side of the support ring 64, as shown in FIG. 4.

Referring back to FIG. 3, a plurality of anti-rotation tabs 82 extend radially inward from the main body portion 66 and are axially spaced forward of the radially extending portion 68. Each of the plurality of stator platforms 84 radially outward of the plurality of stator vanes 60 include at least one radial protrusion 112 protruding radially outward of the platform 84 and received against the anti-rotation tabs 82 to restrict circumferential rotation of the stator vanes 60.

Figure 5:
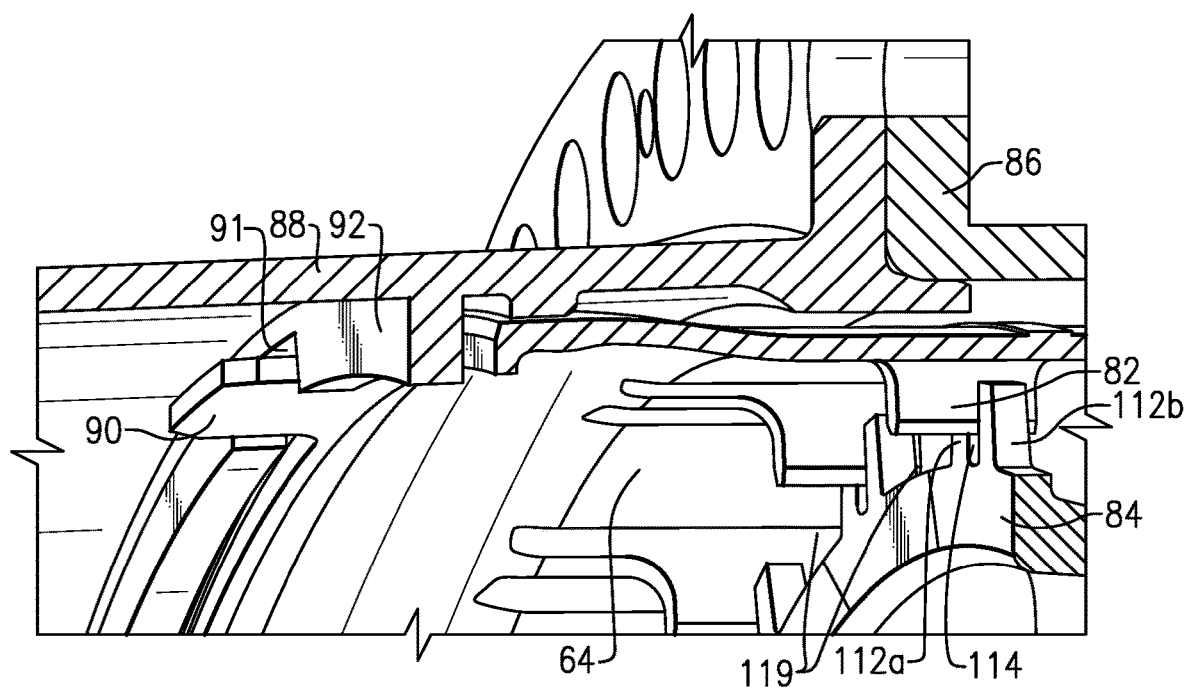
FIG. 5 illustrates an isometric view of an example section of the gas turbine engine.

In one example, as illustrated in FIG. 5, the anti-rotation tabs 82 extend radially inward and are received within a slot 114 formed between adjacent radial protrusions 112a, 112b extending radially outward from a single platform 84 to restrict circumferential rotation of the stator platform 84 and, in turn, restrict circumferential rotation of the associated stator vane 60.

Referring back to FIG. 3, the anti-rotation tabs 82 are received against radial protrusions 116 extending radially outward from an outer panel 118 of a combustor, the example being the combustor 56, to restrict circumferential rotation of the combustor 56. The protrusions 116 are spaced axially forward of the protrusions 112 of the platforms 84. In the example ring 64, there are 32 tabs 82.

Referring to FIGS. 3 and 5, the protrusions 112, 116 and the tabs 82 provide a plurality of gaps 119 for conveying a fluid flow $F_1$ from a cavity 121 between the combustor panel 118 and diffuser case 88 axially aft through the openings 70 and 80. The example fluid flow F1 may be outer diffuser case air or combustor bypass air.

In the disclosed example, a portion 120 of the support ring 64 is axially aligned with and radially outward of the combustor 56. A portion 122 of the support ring 64 is axially aligned with and radially outward of the stator vanes 60. The portion 120 of the support ring 64 is axially aligned with and radially inward of the diffuser case 88. The portion 122 of the support ring 64 is axially aligned with and radially inward of the turbine case 86. The diffuser case 88 is attached to the turbine case 86 by a plurality of fasteners 124.

The platform 84 may include a chamfered surface adjacent the surface 108 and extending radially outward as it extends axially aft to direct fluid F flowing through the openings 70 aft of the platform 84.

A flange 134 extends radially outward from the main body portion 66 opposite the main body portion 66 from the anti-rotation tab 82. The face 74 extends radially outward of a radially outermost surface 138 of the main body portion and is axially spaced forward from and aligned with faces 140 of radially inward extending tabs 142 from the turbine case 86.

In the disclosed example, the main body portion 66 includes a central section 144 that is parallel to the center axis A1, an aft section 146 that has at least a portion that extends radially outward as it extends axially aft toward the radially extending portion 68, and a forward section 148 that has at least a portion that extends radially outward as it extends axially forward toward the tabs 90. The anti-rotation tabs 82 and the flange 134 extend from the central section 144. The radially extending section 68 extends from the aft section 146. The tabs 90 extend from the forward section 148, which includes a radially outer face 150 configured to be received against a radially inward extending and full circumference bumper 152 of the diffuser case 88.

The example main body portion 66 and radially extending portion 68 are monolithic and form a full 360° hoop about the axis $A_1$.

The example support ring 64 restricts the stator vanes 60, stator platforms 84, and combustor panel 118 from rotating circumferentially. The example support ring 64 further allows fluid $F_1$ to flow from the cavity 121 between the combustor panel 118 and the diffuser case 88 axially aft through the openings 70 toward the adjacent rotor section for the cooling of components of the adjacent rotor section, including through the openings 80 and to the blade outer air seals 76 and blade outer air seal supports 78. The sections and openings of the support ring 64 are positioned and dimensioned to allow for optimal fluid parameters such as fluid pressure and flow rate for the fluid flow $F_1$.

FIG. 6 illustrates a flow chart of an example method 300 of assembling a gas turbine engine, according to, but not limited to, the examples disclosed. The method 300 includes, at 302, providing a stator support ring 64 radially outward of a plurality of stator vanes 60 and an associated plurality of stator platforms 84. At 304, the method 300 includes aligning a plurality of cylindrical openings 70 in the support ring with a plurality of BOAS support openings 80 radially outward of adjacent rotor blades 62. At 306, the method 300 includes engaging a plurality of radially extending anti-rotation tabs 82 of the support ring 64 with a plurality of radial protrusions 112 extending from the stator platforms 84 to restrict circumferential rotation of the stator vanes 60.

At 308, the method 300 may include engaging the plurality of radially extending anti-rotation tabs 82 with a plurality of radially extending protrusions 116 extending from a combustor panel 118 in an adjacent combustor section 56 to restrict circumferential rotation of the combustor panel 118. At 310, the method 300 may include engaging a plurality of axially extending anti-rotation tabs 90 of the support ring 64 with a plurality of slots 91 in a diffuser case 88 of the combustor section 56 to restrict circumferential rotation of the support ring 64. At 312, the method may include positioning at least a portion of each of the openings 70 radially outward of an outer surface 108 of one or more rails 106 of the stator platforms 84.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine comprising:
   a turbine section, comprising:
      a plurality of stator vanes;
      a support ring radially outward of the plurality of stator vanes and configured to restrict the plurality of stator vanes from rotating, the support ring comprising:
         a main body portion extending circumferentially about a center axis, a radially extending portion extending radially from the main body portion and having a plurality of openings, and a plurality of anti-rotation tabs extending radially inward from the main body portion and axially spaced from the radially extending portion;

a plurality of stator platforms radially outward of the plurality of stator vanes and including a plurality of radial protrusions received against the anti-rotation tabs to restrict circumferential rotation of the plurality of stator vanes;

a plurality of rotor blades axially spaced from the plurality of stator vanes;

one or more blade outer air seals radially outward of the plurality of rotor blades; and one or more blade outer air seal supports for supporting the one or more blade outer air seals and radially outward of the blade outer air seals, wherein the one or more blade outer air seal supports include a plurality of blade outer air seal support openings, each of the plurality of blade outer air seal support openings at least partially aligned radially and circumferentially with a corresponding one of the plurality of openings in the support ring.

2. The gas turbine engine as recited in claim 1, wherein the plurality of openings are cylindrical and are 0.14 to 0.18 inches in diameter, and a center of each of the plurality of openings is 8.5 to 9.5 inches from the center axis.

3. The gas turbine engine as recited in claim 1, comprising a first face at a first axial side of the radially extending portion;

a second face at a second axial side of the radially extending portion opposite the first axial side, and the plurality of openings extending from the first face to the second face, wherein the first face lies in a first plane perpendicular to the center axis, and the second face lies in a second plane perpendicular to the center axis.

4. The gas turbine engine as recited in claim 1, wherein the plurality of openings comprises 45 openings, wherein a center point of each of the plurality of openings is spaced 8 degrees from a center point of an adjacent one of the plurality of openings.

5. The gas turbine engine as recited in claim 1, wherein the plurality of stator platforms each include a radially outward extending rail, wherein at least a portion of each of the plurality of openings is radially outward of the rail in an associated one of the plurality of platforms.

6. The gas turbine engine as recited in claim 1 comprising:
a combustor section comprising
a combustor panel; and
a plurality of panel radial protrusions extending radially outward from the combustor panel, wherein the plurality of panel radial protrusions are received against the plurality of radially extending anti-rotation tabs.

7. The gas turbine engine as recited in claim 6, wherein the support ring comprises a plurality of axially extending anti-rotation tabs extending from an axial end of the main body portion and each tab configured to be received in a slot in a diffuser case of the combustor section to restrict circumferential rotation of the support ring.

8. The gas turbine engine as recited in claim 6, wherein the radial protrusions, the panel radial protrusions, and the anti-rotation tabs provide a plurality of gaps for conveying fluid flow from a cavity between the combustor panel and a diffuser case axially aft through the blade outer air seal support openings and the plurality of openings in the support ring.

9. The gas turbine engine as recited in claim 6, wherein the radial protrusions and the anti-rotation tabs provide a plurality of gaps for conveying fluid flow from a cavity axially aft through the blade outer air seal support openings and the plurality of openings in the support ring.

10. The gas turbine engine as recited in claim 1, wherein the plurality of openings are cylindrical and are 0.14 to 0.18 inches in diameter.

11. The gas turbine engine as recited in claim 1, wherein a center of each of the plurality of openings is 8.5 to 9.5 inches from the center axis.

12. The gas turbine engine as recited in claim 1, comprising a gasket, wherein the a radially extending portion includes a gasket receiving portion that receives the gasket.

13. The gas turbine engine as recited in claim 12, wherein the gasket receiving portion includes an inner extension, an outer extension, and an interfacing portion that connects the inner extension to the outer extension and provides a face, and the gasket is received against the face.

14. The gas turbine engine as recited in claim 1, wherein the plurality of openings are equally spaced apart in the circumferential direction.

15. The gas turbine engine as recited in claim 1, wherein the support ring includes a top-dead-center marker, and a center point of one of the plurality of openings is spaced 6.67 degrees from the top-dead-center marker.

16. The gas turbine engine as recited in claim 2, wherein the plurality of openings comprises 45 openings, wherein a center point of each of the plurality of openings is spaced 8 degrees from a center point of an adjacent one of the plurality of openings.

17. A gas turbine engine comprising:
a turbine section, comprising:
a plurality of stator vanes;
a support ring about a center axis and radially outward of the plurality of stator vanes and configured to restrict the plurality of stator vanes from rotating, the support ring comprising:
a main body portion,
a radially extending portion extending radially from the main body portion and having a plurality of openings, and
a plurality of anti-rotation tabs extending radially inward from the main body portion and axially spaced from the radially extending portion;
a plurality of stator platforms radially outward of the plurality of stator vanes and including a plurality of radial protrusions received against the anti-rotation tabs to restrict circumferential rotation of the plurality of stator vanes;
a plurality of rotor blades;
one or more blade outer air seals radially outward of the plurality of rotor blades; and
one or more blade outer air seal supports radially outward of the blade outer air seals, wherein the one or more blade outer air seal supports include a plurality of blade outer air seal support openings, each of the plurality of blade outer air seal support openings at least partially aligned radially and circumferentially with a corresponding one of the plurality of openings in the support ring.

18. The gas turbine engine as recited in claim 17, comprising:
   a combustor section comprising
      a combustor panel; and
      a plurality of panel radial protrusions extending radially outward from the combustor panel, wherein the plurality of panel radial protrusions are received against the plurality of radially extending anti-rotation tabs.

19. The gas turbine engine as recited in claim 18, wherein the support ring comprises a plurality of axially extending anti-rotation tabs extending from an axial end of the main body portion and each tab configured to be received in a slot in a diffuser case of the combustor section to restrict circumferential rotation of the support ring.

* * * * *